United States Patent [19]

Dodd

[11] 4,319,464

[45] Mar. 16, 1982

[54] REFRIGERATED CONTAINER

[76] Inventor: N. Ray Dodd, 1494 N. High St., Apt. 14, Columbus, Ohio 43201

[21] Appl. No.: 172,367

[22] Filed: Jul. 25, 1980

[51] Int. Cl.³ .............................................. F25D 3/08
[52] U.S. Cl. ...................................... 62/371; 222/541; 62/4; 62/294
[58] Field of Search .................... 62/371, 372, 268, 4, 62/293, 294; 239/309; 222/541; 220/270

[56] References Cited

U.S. PATENT DOCUMENTS

| | | | |
|---|---|---|---|
| 3,088,680 | 5/1963 | Fulton et al. | 222/541 |
| 3,241,731 | 3/1966 | Bright et al. | 222/541 |
| 3,326,013 | 6/1967 | Jacobs | 62/371 |
| 3,620,406 | 11/1971 | Evans et al. | 62/371 |
| 3,726,106 | 4/1973 | Jaeger | 62/371 |
| 3,852,975 | 12/1974 | Beck | 62/294 |

*Primary Examiner*—Norman Yudkoff
*Attorney, Agent, or Firm*—Robert B. Watkins

[57] ABSTRACT

A container constructed to cool the contents of the container by releasing a refrigerant from a pressure vessel within the container to chill the contents of the container by an endothermic expansion process of the refrigerant as a gas to the outside of the container. The pressure vessel within the container is conically formed at one end of the container as an integral part of the end wall structure of the container. The refrigerant gas is released by breaking a frangible end off a valve.

9 Claims, 6 Drawing Figures

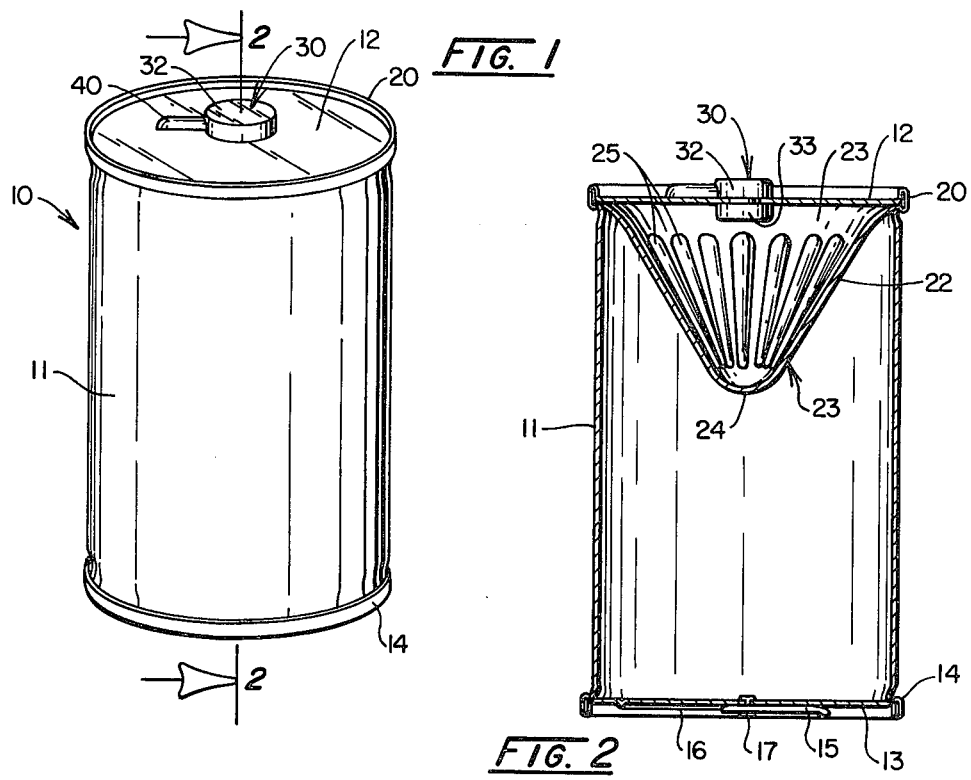
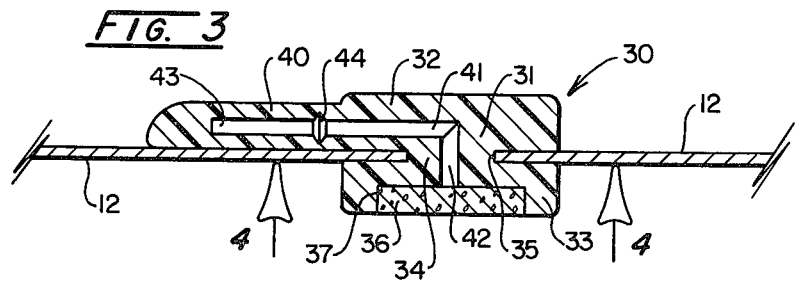
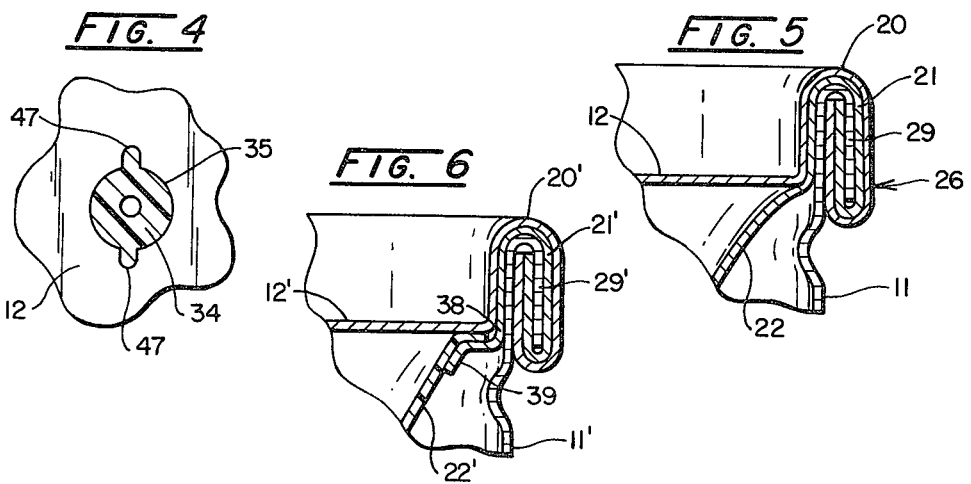

REFRIGERATED CONTAINER

SUMMARY OF INVENTION

This invention relates to a container that incorporates a pressure vessel portion in which a refrigerant gas under superatmospheric pressure is contained. The pressure vessel portion has a frangible valve interposed through one side. The frangible valve contains a blocked conduit for the refrigerant gas.

Refrigeration is applied to the contents of the container when the frangible valve is broken, opening the blocked conduit, and allowing the pressurized refrigerant gas to escape to the atmosphere in an endothermic chemical process.

Containers are used for many different materials where it is desirable or necessary to refrigerate the materials contained. The conventional way of doing this is to either cool the entire container by placing it in a chilled atmosphere or by circulating a chilled working fluid in conduits through the container. In each of these cases the refrigeration process takes place outside of the container, that is, a refrigerant gas is expanded endothermically in some other place and there is an intermediate chilled working fluid. In the process of this invention refrigerant gas is expanded inside the container at the time that the chilling effect is desired.

Although this invention may be applied to containers with a variety of contents, a preferred application of the invention is in connection with chilling beverages whose flavors and refreshment are enhanced when cooled. Examples are beer and carbonated soft drinks. It is the universal practice to package these beverages in containers or "cans" of a size that the contents are consumed by one individual at one sitting. In order to cool the contents the full containers are chilled prior to opening or the contents are poured over ice. In either case there is inconvenience associated with arranging for the contents to be chilled. It is a general and important purpose of this invention that this inconvenience is overcome by providing a container in which refrigeration takes place within the container itself.

For the purpose of definition within this disclosure, the term beverage container with refrigerant gas inside refers to that class of beverage containers wherein a vessel of refrigerant gas under pressure is allowed to expand and extract heat from the container and the beverage contents. Various approaches, designs and constructions of beverage containers with refrigerant inside are to be found in the patent prior art, including U.S. Pat. Nos.:

| | | |
|---|---|---|
| 3,269,141 | 3,520,148 | 3,803,867 |
| 3,309,890 | 3,597,937 | 3,842,617 |
| 3,326,013 | 3,636,726 | 3,852,975 |
| 3,417,573 | 3,696,633 | 3,881,321 |
| 3,494,141 | 3,726,106 | 3,919,856 |
| 3,494,142 | 3,759,060 | 3,987,643 |
| 3,494,143 | | |

These typical examples of prior art patents are listed in recognition of the duty of disclosure of related subject matter, which may be relevant, under 37CFR 1.56.

Each of these of prior approaches, as well as this invention, has the object of providing the convenience of "on the spot" cooling and refrigeration for the contents of the container. Many other structure and process objectives must be met before the overall convenience objective can be successfully met and marketed.

Objectives in the design, manufacture, and marketing of this class of beverage container include: safety for the users; simplicity of the manufacturing process; and the use of adequate, strong, saleable and relatively inexpensive materials. However, in order for an invention of this type to have commercial success, the cost, the components and the process must bring the container product to the user at a purchase price equal to the convenience value to the user. While the exact amount that the user will pay for the added convenience is not known, it is clear that every concept which reduces cost, either in the manufacturing process or in the cost of materials, is of the upmost importance.

It is an object of this invention to provide, in a beverage container with refrigerant inside, a pressure vessel refrigerant portion which is simple to make, of one piece, thermally efficient, and structurally strong and safe.

It is a further object to provide a frangible valve for the release of the pressurized refrigerant which is convenient for the user to operate, is safe, made of low-cost, readily available materials, and which is formed as part of the manufacturing process.

Another object of this invention is to provide a container in which the refrigerant inside is contained in a pressure vessel that forms a part of the closure of the beverage container during the manufacturing process of the beverage container.

In summary, this invention, in a preferred embodiment, is a beverage container with refrigerant inside, in which the refrigerant is contained by a conically shaped ribbed wall between the refrigerant and the beverage; in which the edge of the pressure vessel forms a seal in the closure of the container; and in which the valve is formed of frangible plastic, a portion of which can be broken by the user to permit the refrigerant gas to escape, and the frangible portion of which is positioned for easy manipulation by the user's finger.

A clearer understanding of the invention will be apparent from the following drawings and detailed description.

BRIEF DESCRIPTION OF THE DRAWINGS

FIG. 1 is a perspective view of the outside of a container having this invention incorporated therein.

FIG. 2 is a sectional elevational view of the container of this invention taken on the line 2—2 of FIG. 1.

FIG. 3 is an enlarged sectional view of the frangible valve of this invention.

FIG. 4 is a partially sectional plan view taken on the line 4—4 of FIG. 3.

FIG. 5 is an enlarged partially sectional view of the edge of the container at one end.

FIG. 6 is a modified partial sectional view of the edge of the container shown in FIG. 5.

DETAILED DESCRIPTION OF THE DISCLOSURE OF THE INVENTION

Referring to FIGS. 1 and 2, a container 10 has a cylindrical side wall 11 and circular end wall closures 12 and 13. Cylindrical wall 11 and enclosure wall 13 are joined in a folded leak-proof seam 14 of conventional well known construction. Enclosure wall 13 has an opening tab 15 capable of being folded away from enclosure end wall 13, to break open a previously weakened aperture portion 16, in the conventionally typical beverage container opening procedure. Tab 15 may be fastened to closure end wall 13 by a rivet 17 or other well known means.

Enclosure end wall 12 has a circular edge 20 which overlaps an internal edge 21 (See FIG. 5) of a conically formed member 22. Conical member 22 is formed in a dome portion 23 at a central internal end 24. Conical member 22 and end wall 12 form a pressure vessel 23 inside the container 10.

In a preferred embodiment, the surface of conical member 22 is provided with radial embossed ridges 25 which provide greater structural strength to the pressure vessel 23 and also increase the surface area of the conical member 22.

Referring to FIG. 5, the members, end wall 12, side wall 11, and conical member 22 are formed in a leak-proof pressure sealed swaged or seam welded joint 26 in which the circular edge 20 folds over the internal edge 29, as a unit. The unit is folded over a flange 29 of the cylindrical wall 11. Construction of the joint is typical and well known in container manufacturing processes except that the internal edge 21 between the circular edge 20 and the flange 29 is usually a separate piece of sealing material. The internal edge 21 of the conical member 22 replaces the separate sealing material which is a savings in the container manufacturing process.

It will be apparent that the container 11 is in many respects a typical beverage container that is commonly used for carbonated beverages such as soft drinks and beer. These containers are usually made from metal and are called "cans". The processes and materials for making beverage cans is well known and is highly automated. However, the container of this invention differs from the conventional beverage can in particular with respect to the pressure vessel 23 and a frangible valve 30. During the manufacturing process of the container of this invention, the pressure vessel 23 is filled with a refrigerant gas under pressure. The gas may be carbon dioxide or a mixture of gases such as nitrogen and carbon dioxide. At a pressure of about 90 psi the gas is a liquid or semi-liquid at normal ambient temperature.

A beverage or other material is filled into the container 10 during a conventional filling and sealing automated process, so that when it is in the condition shown in FIGS. 1, 2 and 3, container 10 is filled with the contents, and the pressure vessel 23 is filled with refrigerant gas under pressure.

In operation when the frangible valve 30 is operated, in a procedure to be later described, the refrigerant gas is released from the pressure vessel 23 to the outside atmosphere in a process of vaporization gaseous expansion and pressure reduction in the pressure vessel 23. This process is endothermic, taking heat from the surrounding materials and particularly through the wall of conical member 22 from the contents of the container 10. The result is that the contents are chilled insitu.

Within a minute or so, if the container 10 is opened by means of the tab 15 the cold contents are ready to be used.

In the preferred embodiment shown in FIG. 2, the ridges 25 enhance the heat transfer process by increasing the area in contact with the contents of the container.

Referring to FIG. 3, frangible valve 30 comprises primarily a cylindrical portion 31 with an outer section 32 and an inner section 33. Outer section 32 and inner section 33 are connected and meet in a throat section 34 which is formed in an aperture 35 in the end wall 12. A cylindrical diffuser 36 is fitted into a mating recess 37 of inner section 33. Frangible valve 30 is formed with a frangible portion 40 extending laterally from one side of upper section 32. Frangible portion 40 is reduced in size compared to cylindrical portion 31, and is appropriately of a size to be engaged by the end of a finger of a person with sufficient force to move the frangible portion with finger pressure.

Frangible valve 30 is made of a thermosetting plastic material such as polyethylene or polystyrene, and is formed into one integral material component on both sides of end wall 12. During the molding process, which may be an injection or blow molding process, a flowline conduit 41 is formed as a central portion 42 meeting a lateral portion 43. At a position relatively near the intersection of the reduced size frangible portion 40 and the cylindrical portion 31, an enlarged cavity or serration 44 is formed in the conduit 41. The enlarged cavity, 44 serves to weaken the reduced size frangible portion 40 rendering it breakable under pressure from a finger or thumb and allowing the end to be broken off. When the end of the reduced size frangible portion 40 is broken off, the end of the conduit 41 is exposed allowing the pressurized refrigerant to diffuse through the diffuser 36 and outward through the conduit 41 to the atmosphere, carrying out the refrigeration process.

Alternatively, the enlarged cavity or serration 44 could be replaced with a circumferential groove on the outside of the frangible portion 40. The groove would weaken the reduced size portion allowing it to be broken off in the manner previously described.

It will be seen that when the user is ready to refrigerate the contents of the container 10, the user breaks off the end of the frangible valve 30 allowing the refrigerant gas to escape and the contents of the container to be chilled.

Referring to FIG. 4, in order to prevent frangible valve 30 from rotating in the aperture 35 when pressure is applied to the reduced size portion 40, asymetric notches 47 are provided. During the molding operation and the formation of the frangible valve 30, valve material component flows into the notches 47.

The diffuser 36 is, in a preferred embodiment, formed by pressing a granulated material such as sintered aluminum into a composite. The composite will have openings through the inner stitches of the material through which the refrigerant gas can migrate slowly into the conduit 41 and outward to the atmosphere.

In order that the atmosphere shall not be contaminated it is preferable that the refrigerant gas be a material other than freon which has been generally used in the past. A suitable material could be a mixture of carbon dioxide and nitrogen.

The beverage container with refrigerant gas inside of this invention has many advantages and meets many of the objectives for a container of this type. The construction is relatively simple and easily adaptable from well known conventional container manufacturing processes, techniques and materials. The frangible valve is relatively inexpensive and is formed without waste of materials since it is formed of a single component material in place at the time it takes its constructed shape.

While in the preferred embodiment of the invention shown, the conduit 41 for the release of the refrigerant gas is formed at a right angle to the axial center line of the conduit from the interior 42, and contiguous proximate to the end wall 12, in another embodiment the conduit 43 and the reduced size valve material component 40 could be at a different angle. In the preferred embodiment, the conduit is placed at a right angle so that the escaping gas will be projected along the end wall 12, rather than directly outward toward the person using the container. This is thought to be a greater convenience, and a safety measure.

An advantage of the valve construction of this invention is the low profile presented by the valve 30 relative to the end wall 12. Since the top of the valve 30 is substantially even with the top of the low circular edge 20 the containers are stackable in a very small space for a container of this type with refrigerant inside.

The pressure vessel conical member 22 may be either formed of metal or molded of a thermosetting plastic material. In some circumstances one may be advantageous over the other for economic reasons or because of the type of contents that are intended for the container.

Referring to FIG. 6, in another embodiment, the conical member 22' is formed to interface on the bottom of the end wall 12' and end at a wall 38 of a ring seal 39. Ring seal 39 is folded over and between the circular edge 20' and the flange 29' of the internal edge 21'.

The embodiment of FIG. 6, is used when it is desired to reuse the conical member 22'. After use the container can be recycled and the conical member 22' removed by peeling back the ring seal 39.

Because of this construction of the pressure vessel 23, it will be reusable under certain circumstances which will further enhance the economics of the use of the container of this invention.

The use of a controlled porosity diffuser cylinder serves to maximize cooling, and has other advantages such as prohibiting the violent spewing of liquid refrigerants which might injure the user, and eliminating the need for close or difficult tolerances in the manufacture which has been a criteria of prior art valves for this purpose.

It is herein understood that although the present invention has been specifically disclosed with the preferred embodiments and examples, modification and variations of these concepts herein disclosed may be resorted to be those skilled in the art. Such modifications and variations are considered to be within the scope of the invention and the appended claims.

What is claimed is:

1. A beverage container having an inside and an outside for refrigerant inside comprising:

a. an enclosure for a beverage material constructed of a plurality of connected side and end walls with one of the end walls forming a wall of a pressure vessel for a refrigerant material inside the container;
   b. the pressure vessel being formed of the one end wall and a conically formed member extending into the container from the one end wall;
   c. a frangible valve formed in an aperture in the one end wall, the valve being formed of plastic material and secured in the aperture, the valve having an extended portion contiguous with the end wall and closed at the end, providing a flowline conduit for the refrigerant material, the extended portion having a serration to facilitate breaking of the extended portion and release of the refrigerant material by vaporization; and
   d. a diffuser in the conduit to diffuse the refrigerant material as it passes from inside the pressure vessel to outside the container.

2. A container according to claim 1 wherein the container is a metal can.

3. A container according to claim 1 wherein the container comprises a cylindrical wall with end wall closures.

4. A container according to claim 1 wherein the conical formed member has radial ribs therein extending the surface area of contact between the refrigerant on the one side, and the material on the other side.

5. A container according to claim 1 wherein the container is formed of a cylindrical side and circular ends, and wherein at least one end is formed of a circular end wall and a conical pressure vessel member, and an edge of the end wall and an edge of the conical member are joined to the cylindrical side of the container by a sealed circumferential joint.

6. A container according to claim 5 wherein means is provided to prevent the rotation of the valve relative to the container end.

7. A container according to claim 5 wherein the edge of the conical member is interfaced and held to the end wall by a ring seal which joins the cylindrical side of the container by the circumferential joint.

8. A container according to claim 7 wherein the conical member is molded of plastic material.

9. A container according to claim 1 wherein the diffuser comprises a compacted composite material.

* * * * *